United States Patent
Mirbach et al.

(10) Patent No.: US 9,025,071 B2
(45) Date of Patent: May 5, 2015

(54) METHOD FOR CONTAMINATION DETECTION IN A TOF RANGE CAMERA

(75) Inventors: Bruno Mirbach, Konz (DE); Romuald Ginhoux, Cannes la Bocca (FR)

(73) Assignee: IEE International Electronics & Engineering S.A., Luxembourg (LU)

( * ) Notice: Subject to any disclaimer, the term of this patent is extended or adjusted under 35 U.S.C. 154(b) by 536 days.

(21) Appl. No.: 12/664,025

(22) PCT Filed: Jun. 12, 2008

(86) PCT No.: PCT/EP2008/057390
§ 371 (c)(1),
(2), (4) Date: Jul. 12, 2010

(87) PCT Pub. No.: WO2008/152095
PCT Pub. Date: Dec. 18, 2008

(65) Prior Publication Data
US 2010/0283888 A1    Nov. 11, 2010

(30) Foreign Application Priority Data
Jun. 15, 2007  (EP) .................................... 07110379

(51) Int. Cl.
*H04N 5/232* (2006.01)
*G01S 7/497* (2006.01)
*G01S 17/89* (2006.01)
*H04N 5/222* (2006.01)

(52) U.S. Cl.
CPC ............... *H04N 5/232* (2013.01); *G01S 7/497* (2013.01); *G01S 17/89* (2013.01); *H04N 5/2226* (2013.01); *G01S 2007/4975* (2013.01)

(58) Field of Classification Search
CPC ..... H04N 5/23212; G01S 17/89; G01S 7/486; G02B 7/32; G02B 7/28
USPC .......................................... 348/348; 356/5.01
See application file for complete search history.

(56) References Cited

U.S. PATENT DOCUMENTS

| 5,724,141 | A | 3/1998 | Nishino | |
|---|---|---|---|---|
| 5,966,678 | A | 10/1999 | Lam | |
| 6,201,236 | B1 | 3/2001 | Juds | |
| 7,777,173 | B2* | 8/2010 | Price et al. | 250/221 |
| 7,991,241 | B2* | 8/2011 | Kusama | 382/254 |
| 8,089,536 | B2* | 1/2012 | Kotani | 348/246 |
| 8,208,752 | B2* | 6/2012 | Ishii | 382/275 |
| 2004/0114033 | A1* | 6/2004 | Eian et al. | 348/42 |
| 2006/0176469 | A1* | 8/2006 | O'Connor et al. | 356/5.11 |
| 2006/0251293 | A1 | 11/2006 | Piirainen et al. | |
| 2007/0263902 | A1* | 11/2007 | Higuchi et al. | 382/104 |
| 2008/0241951 | A1* | 10/2008 | Battulga et al. | 436/164 |

OTHER PUBLICATIONS

International Search Report; PCT/EP2008/057390; Jul. 30, 2008.
Robert Lange, et al.; "Solid-State Time-of-Flight Range Camera"; IEEE Journal of Quantum Electronics, IEEE Service Center, Piscataway, NJ, US, vol. 37, No. 3, Mar. 2001; XP011052593; ISSN: 0018-9197.

* cited by examiner

Primary Examiner — Twyler Haskins
Assistant Examiner — Fayez Bhuiyan
(74) Attorney, Agent, or Firm — Cantor Colburn LLP

(57) ABSTRACT

A method for contamination detection in a time-of-flight (TOF) range imaging system is described, wherein the TOF range imaging system receives light reflected from a scene, through an optical interface, on an imager sensor having an array of pixels, and wherein distance information and amplitude information are determined for the sensor pixels. The presence of contamination on the optical interface is determined on the basis of amplitude information determined for the sensor pixels.

6 Claims, 2 Drawing Sheets

METHOD FOR CONTAMINATION DETECTION IN A TOF RANGE CAMERA

TECHNICAL FIELD

The present invention generally relates to the detection of contamination in a TOF range imaging system, and particularly on the optics of a time-of-flight range camera system.

BACKGROUND ART

Occupant detection and classification devices, which are based on optical sensors are now available in modern cars. The information determined by such devices is a seat occupancy class, which is often used for safety critical applications such as smart control of adaptive air bags. These devices typically consist of a control and computing unit and a sensor unit, where the control unit analyzes the images provided by the sensor unit in order to determine the most probable seat occupancy class, for instance "empty", "child seat" or "passenger", and afterwards forward it to the air bag control unit.

Conventional optical detection and classification devices typically rely on a real-time range camera without moving parts based on the time-of-flight (TOF) principle (an example of such TOF range camera is e.g. described by R. Lange and P. Seitz in "Solid-State Time-of-Flight Range Camera", IEEE Journal of Quantum Electronics, Vol. 37, No. 3, March 2001). The detection and classification device mainly comprises a computing unit and a sensor unit. The sensor unit features an imager sensor operated on the TOF principle and an associated optical interface comprising one or more lenses to collect and focus the light coming from the observed scene onto the imager. The sensor unit also integrates the active illumination module emitting e.g. visible or near infrared radiation that will reflect on the objects in the scene and be detected by the sensor unit.

An inherent problem of any optical system is that of contamination (un-cleanliness). Indeed, the optical interface of the sensor unit to the car interior in an occupant detection and classification device is subject to contamination such as dirt, dust, dew, grease, scratches, finger tips etc. coming from the passenger area. By modifying either locally or homogeneously the optical properties of the sensor unit, contamination has the possible effect to modify the performance of the operation of the control and computing unit and therefore to possibly introduce errors in the determined information, for instance the occupancy class of an occupant detection and classification device.

The problem of contamination is particularly acute for such safety critical applications and it would be good to have a simple and efficient method of determining contamination in such TOF range camera for this and other types of applications.

BRIEF SUMMARY

The disclosure provides a method for contamination detection in a TOF range imaging system.

The present invention proposes the use of amplitude information associated with the sensors pixels to detect the presence of contamination on the optical interface of a time-of-flight range imaging system. The present inventors have indeed observed that the presence of contamination on the optical interface leads to a blurring of amplitude images/data, either locally or homogeneously over the whole sensor area. This blurring mainly leads to modification in the distribution of amplitude values due to diffraction of incoming modulated light between neighbouring sensor pixels in the imager array. This results in a loss of contrast, which mainly affects background properties.

As is well known, in an imaging, i.e. non-scanning, TOF-camera the distance information is related to light wave travel time, but the amplitude of the detected optical signal component is typically also determined in systems using modulated light waves for scene illumination. Indeed, the amplitude defines the signal-to-background ratio and hence the system accuracy.

Accordingly, the present invention proposes a method of contamination detection in a TOF range imaging system, the imaging system receiving light reflected from a scene, through an optical interface, on an imager sensor having an array of pixels, wherein distance information and amplitude information are determined for the sensor pixels. According to an important aspect of the present invention, the presence of contamination on the optical interface is determined on the basis of the amplitude information determined for the sensor pixels.

The method of the invention is extremely simple to implement and does not require any additional hardware to illuminate the surface of the optical interface nor to detect reflected light, since an active illumination module is a conventional feature of a TOF range camera system.

It shall be appreciated that the present method is especially suited for use with low resolution sensors as no image transformation is needed, which would require standard VGA resolution or which could be sensitive to image noise (e.g. gradient operator, Laplacian operator, fast Fourier transform). Further, no additional computational power is required as no specific image operations are required (such as image correlation). Another advantageous aspect of the present method is its independence with respect to the scene contents although the optics are typically focused to the scene and not to the surface of the optical interface, whereby the optical device can be operated simultaneously for its main function (range measurement) and for contamination detection. Additionally, the method can be used in addition to other contamination detection methods or systems. Last but not least, the coupled operation between illumination unit and sensor unit according to the TOF principle avoids sensitivity problems due to external lighting conditions.

In practice, the scene may be illuminated by means of an active illumination module emitting modulated light waves and the distance information is determined based on the phase delay between emitted and received light signal. In the sensor array, received light is preferably synchronously demodulated in parallel at each pixel to determine the phase and amplitude information or data. Accordingly, at a given time, the set of amplitude values determined at each pixel of the sensor array can be considered to form an "amplitude image".

In one embodiment, the method comprises: determining the number of pixels having an amplitude lower than a given amplitude threshold, and concluding to the presence of contamination in case this number of pixels having an amplitude lower than the amplitude threshold is less than a predetermined number of pixels. Otherwise, it is concluded that the TOF camera system is not contaminated.

In another embodiment, the method comprises: determining the number of pixels per amplitude value; determining the amplitude value for which the sum of pixels of lower amplitude equals a predetermined number of pixels; and concluding to contamination in case this amplitude value equals or exceeds a predetermined amplitude threshold.

Advantageously, in both embodiments, the amplitude threshold is a linear function of the mean of the amplitude values in the image, since the amount of light diffracted over the image is proportional to the light received from the scene. Typically, the amplitude threshold may be chosen so that the number of pixels is about 5% of the mean amplitude value. This mean amplitude value may be calculated as the mean of all pixel amplitude values in the image.

It will be understood that the present invention is applicable to a variety of TOF range imaging system, irrespective of their field of application. The method may be implemented as an independent method using the already available amplitude values or specifically computing these amplitude values if not available. Optimal performances are obtained in applications with a fixed background.

The method proposed can possibly be combined to additional contamination detection means, for instance hardware based methods or other image based methods, in order to increase the performance and robustness of the contamination detection.

BRIEF DESCRIPTION OF THE DRAWINGS

The present invention will be more apparent from the following description of several not limiting embodiments with reference to the attached drawings, wherein.

DETAILED DESCRIPTION

A preferred embodiment of the present method for contamination detection will now be described by way of example with respect to an application concerning an optical occupant detector and classification device 10 integrating an imager sensor operating according to the time-of-flight principle. In this application, the optical occupant detector and classification device 10 outputs classification information that is used in an airbag controller.

Figure 1:
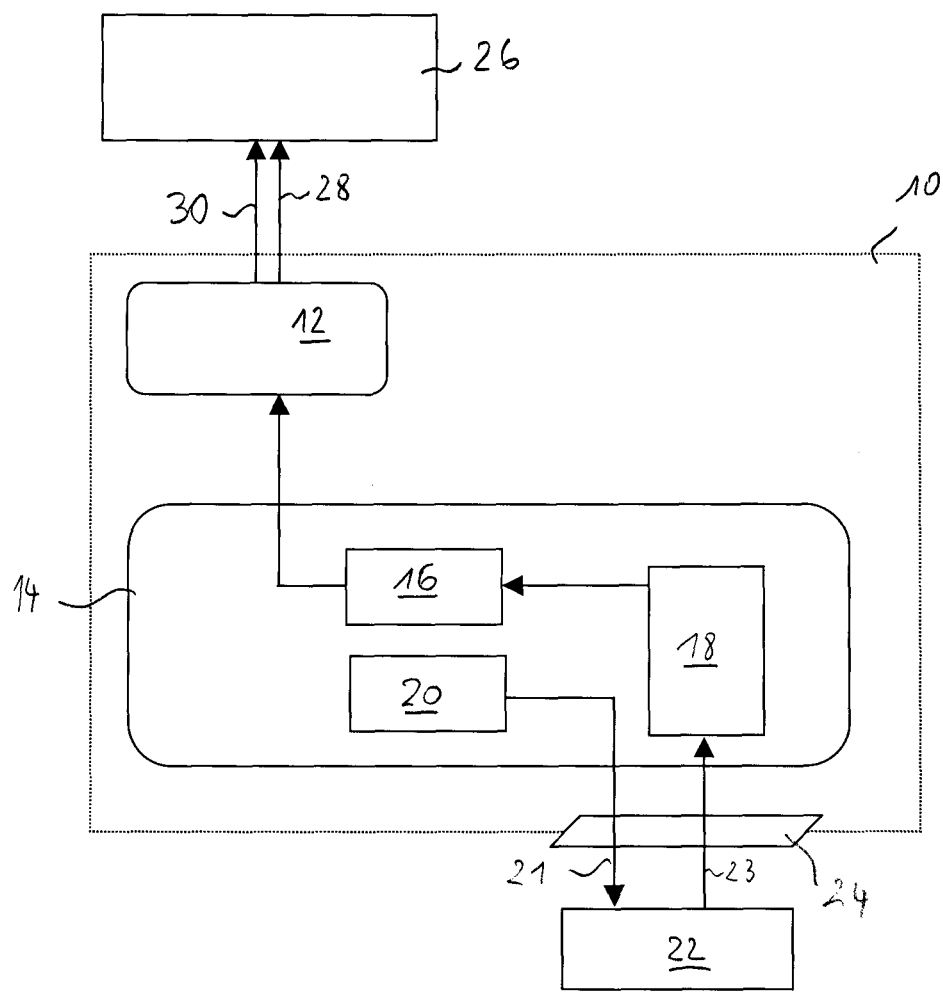
FIG. 1: is a diagram of a conventional optical occupant detection and classification device using a TOF camera system.

The structure of a conventional optical occupant detection and classification device is illustrated in FIG. 1. It comprises a control and computing unit 12 and a sensor unit 14. The sensor unit 14 mainly comprises an imager module 16 associated to an optical interface 18. The imager module 16 may e.g. comprise a 2-D array of lock-in pixels employing the charge-coupled device principle. The sensor unit 14 further advantageously includes an active illumination module 20 to illuminate a scene 22 to be monitored, e.g a car interior, located in the field of view of the optical interface 18. Integration of the illumination module 20 in the sensor unit 14 is favourable in terms of compactness and permits locating the active light source close to the receiver (imager 16), which avoids shadowing effects. The illumination module 20 preferably emits invisible, continuously-modulated light. Light (arrow 21) emitted by the illumination module 20 reflects onto objects in the scene 22 and passes back, as materialised by arrow 23, through the optical interface 18 to be integrated into each pixel of the sensor array of the imager module 16.

The control and computing unit 12 operates the sensor unit 14 according based on the TOF principle. Accordingly, light arriving on each pixel of the imager module's 16 sensor array is demodulated to determine various quantities, and particularly distance (range) information of objects in the scene 22.

The control unit 12 analyses the data/images delivered by the imager module 16 to provide the airbag controller 26 with a class decision information signal 28 about the most probable occupant class of the front passenger seat (occupant class such as empty, child seat or passenger).

As mentioned, the illumination module 20 preferably emits continuously-modulated light waves, whereby the phase difference between sent and received signals is measured by the control and computing unit 12 rather than directly measuring a light pulse's total trip time. As the modulation frequency is known, this measured phase directly corresponds to the time of flight, and thus to the distance.

In the present embodiment the sensor unit 16 uses an imaging, i.e. non-scanning, sensor system. The entire scene 22 is simultaneously illuminated by the illumination module 20 with a modulated light cone. The incoming modulated light is thus synchronously demodulated in parallel at each pixel of the sensor array.

In addition to phase information, amplitude is another parameter that is determined for each pixel. The amplitude of the detected optical signal component is reduced by a factor k, depending on all optical losses. Its height defines the signal-to-background ratio and hence the achievable accuracy is determined. Demodulation of a received modulated signal can be performed by correlation with the original modulation. In practice, a cross correlation is performed in the TOF chip, and produces a set of four cross-correlation coefficients; amplitude and phase information are then calculated from these coefficients. These calculations are known to those skilled in the art and will not be further described herein (general information may e.g. be found in the article by R. Lange and P. Seitz, previously cited).

For the sake of exemplification, we shall mention that in the present case where the entire scene 22 is simultaneously illuminated with a modulated light cone, the light intensity typically varies in time according to:

$$I_s(t)=I_0 \cdot (1+\sin(wt)) \quad \text{(eq. 1)}$$

with a frequency w. The light received by each pixel is modulated with the same frequency, but with a phase shift f=2dw/c (c being the speed of light) proportionally to the distance d of the camera to the point of the object that is optically mapped to the pixel.

The received signal is therefore given by:

$$I_R(t)=B+A \cdot \sin(wt-f) \quad \text{(eq.2)}$$

with f=2dw/c (c being the speed of light). The received signal therefore comprises a non-modulated part B plus a modulated part with amplitude A.

For the sake of completeness it may be added that, as it is known to those skilled in the field of TOF cameras, the amplitude A depends on the intensity $I_0$ of the emitted light, on some constant characteristics of the camera like e.g. an optical loss factor k and the demodulation contrast of the TOF chip, as well as on the light remission coefficient of the scene and the distance of the scene to the camera. Due to the strong dependence of A on the distance, pixels referring to the background of the scene measure in general a smaller amplitude than pixel referring to the foreground of the scene.

Since the optical interface 18 of the device 10 is exposed to the scene 22 (car occupants), it may be subject to contaminations such as dirt, dust, finger tips, grease marks, scratches, hairspray, glass cleaner, glue, stickers, droplets of water or soda etc. Contamination may adhere or deposit onto the optical interface and consequently modify either locally or homogeneously the optical properties of the sensor unit 14. Effect of contamination is then to modify the performance of the operation of the computing unit and therefore to possibly introduce errors in the information determined by the said optical device.

In practice the optical interface 18 is associated with the imager module 16 to collect and focus the incoming light 23 onto the sensor array in the imager module 16. The optical interface 18 may comprise one or more lenses and a protective window or lens, the latter e.g. forming an external wall part of the sensor unit housing. Contamination will thus typically deposit on this protective window that is indicated by reference sign 24 separately from the optical interface 18. The term optical interface should thus be understood as encompassing any optical element in the optical path of the incoming light to the sensor array.

According to the present method, the amplitude images corresponding to the amplitude of received light waves falling on the sensor of the imager module 16 are used to detect the presence of contamination on the optical interface 18. The term amplitude image refers to the demodulated amplitude information/data/values corresponding to a given point of time, the notion of image being related to the two-dimensional arrangement of this information.

The present inventors have indeed observed that contamination on the optical interface has the effect of blurring the amplitude images, either locally or homogeneously over the whole pixel area. Blurring means that the distribution of amplitude values is modified due to diffraction of incoming modulated light between neighboring pixels. This results in a loss of contrast, which affects mainly background properties.

Figure 2:
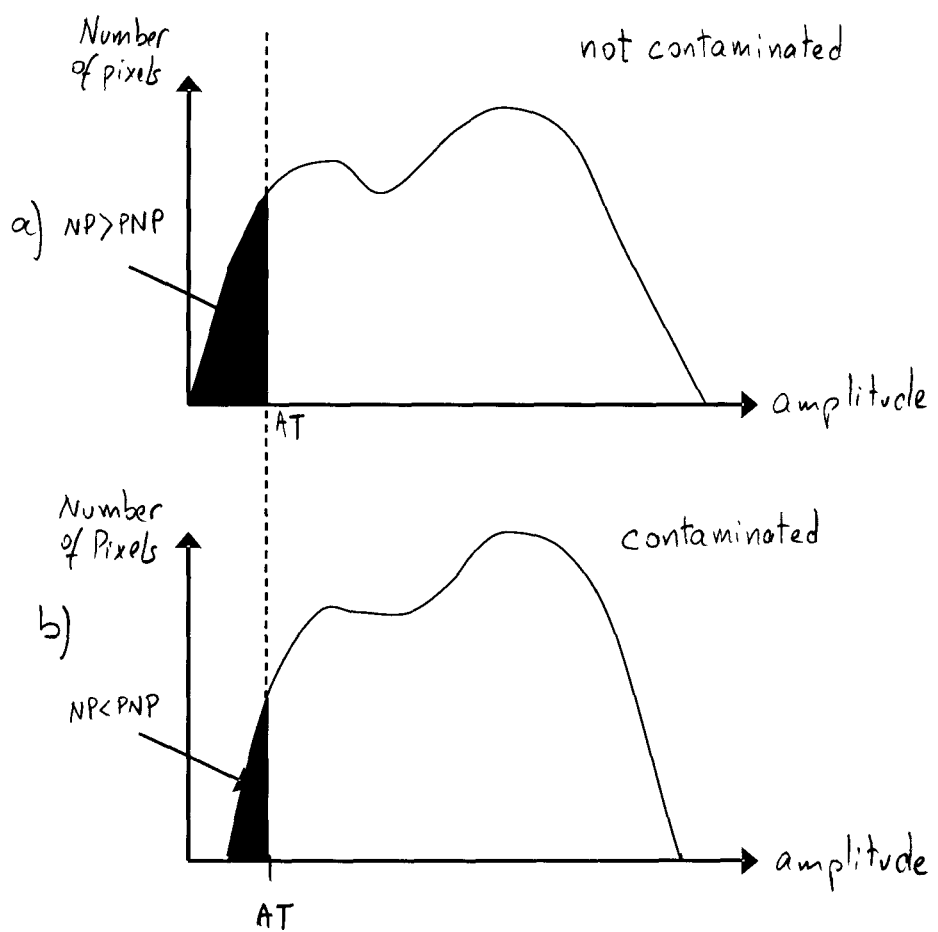
FIG. 2 a) and b) are amplitude histograms corresponding to non-contaminated and contaminated situation, respectively.

The graphs (Number of pixels vs. amplitude) in FIG. 2 show the typical distributions of amplitudes in amplitude images delivered by the control unit with a clean (FIG. 2a) and contaminated (FIG. 2b) optical interface. These histograms show that there is less low amplitudes due to blurriness and loss of contrast created by contamination. As can be seen, the distribution of amplitudes is narrower in the contaminated case (FIG. 2b), that is, it covers a smaller scale of amplitude values. Analysis of the amplitude histograms of amplitude images can therefore be used as a means to detect contamination.

According to one operating mode, contamination detection involves determining the number of pixels NP having an amplitude lower than a given amplitude threshold AT, and concluding to the presence of contamination in case the number of pixels NP is less than a predetermined number of pixels PNP. Otherwise the device is considered as clean/not contaminated (see FIG. 2a). A good value for PNP can be experimentally chosen by ensuring that no clean images have a NP less than PNP.

The amplitude threshold AT is preferably chosen to be proportional to the mean of the amplitude (e.g. 5% of the mean value), as the amount of light diffracted over the image is proportional to the light received from the scene.

More precisely, the amplitude threshold may be determined according to the following formula:

$$AT = A_0 + e_0 \cdot <A> \quad \text{(eq.3)}$$

where $A_0$ is a constant, $<A>$ is the mean amplitude value and $e_0$ is a constant having the meaning of a contamination level.

It is to be noted that the amplitude threshold AT may advantageously be chosen rather small to get maximum independence form the foreground, but it has to remain large enough to guarantee that the number of pixels below that amplitude is statistically sufficiently large.

In an alternative operating mode, contamination detection involves determining the number of pixels per amplitude value (i.e. building an amplitude histogram) and determining the amplitude value $A_s$ for which the sum of pixels of lower amplitude equals a predetermined number of pixels. If this value $A_s$ is larger than the threshold AT, the image is considered as contaminated (see Illustration 2b). Again, as the amount of light diffracted over the image is proportional to the light received from the scene, the amplitude threshold AT should preferably be chosen to be proportional to the mean of the amplitude, as explained above.

Alternatively, one may calculate a contamination level e according to formula:

$$e = (A_s - A_0)/<A> \quad \text{(eq.4)}.$$

If the determined contamination level e is greater than the predefined constant $e_0$, then it may be concluded to contamination.

While scene foreground creates median to large amplitudes in the amplitude images (being closer to the sensor unit, scene foreground receives a larger light intensity from the illumination unit). Scene background on the contrary contributes to low amplitudes in the amplitude images. To take this into account, the present contamination detection method advantageously restricts the analysis of amplitude histograms to the distribution of low amplitudes, thereby avoiding confusion between changes in scene foreground due to contamination and changes in the scene contents. In FIG. 2, the variations of amplitudes of background pixels are indeed due to contamination only. It may be noted that the proposed method has a very low complexity since the main task to perform is to count pixels.

In the exemplary application, the method is advantageously used to deliver a binary signal 30 giving information of contamination presence to the airbag controller if the level of contamination exceeds a certain threshold. This threshold is advantageously chosen below the level of contamination where contamination could lead to a false classification output. In this way the proposed contamination detection can guarantee that no wrong seat occupancy class is communicated to the air bag control unit due to a contamination.

It may be noted that in the context of occupancy detection, amplitude images determined by the control unit have the following two properties.

(a) The field of view of the optical interface of the occupant detection and classification device covers a scene, which is the front passenger area of a car. Though various seat occupants and seat positions usually make up the scene, the scene has nevertheless a fixed and known framework which is defined by the car structure, namely, the car windshield and passenger door and window, the A and B pillars, the dashboard and the middle console. As a consequence, images obtained by the sensor unit have the first common property to share a fixed background.

(b) Secondly, due to coupled operation between illumination unit and sensor unit according to the time of flight principle in the preferred embodiment of the proposed method, amplitude images analyzed by the computing unit are also un-sensitive to external lighting conditions. As it emits light in a fixed and known framework, the illumination unit can therefore be operated with a constant optical power. Consequently a second important property of the amplitude images is that their background pixels have digital values, which are constant over time.

These properties of amplitude images can be advantageously exploited for image based contamination detection in accordance with the present method.

The contamination detection can be used to deliver a continuous signal (value of NP or value of e from eq.4) in a service mode provided that the seat occupant class is known, the continuous signal giving information on the level of contamination present.

In this preferred application the contamination detection is performed as an independent algorithm within the computing unit of the occupant detection and classification device without any additional computation resources or hardware to the sensor unit.

The method proposed can possibly be combined to additional contamination detection means, for instance hardware based methods or other image based methods, in order to increase the performance and robustness of the contamination detection.

The application of the invention is, however, not restricted to optical sensors for occupant classification but can be advantageously employed in any optical surveillance system that with fixed background and active illumination.

The inventions claimed is:

1. A method for contamination detection in a time-of-flight (TOF) range imaging system, said TOF range imaging system receiving light reflected from a scene, through an optical interface, on an imager sensor having an array of pixels, wherein distance information and amplitude information are determined for said sensor pixels, and wherein the presence of contamination disposed on said optical interface is determined on the basis of said amplitude information determined for said sensor pixels, wherein the contamination deposited onto the optical interface includes at least one contaminant, further including the step of evaluating the statistics of the amplitude information over the entire image by determining a number of pixels having an amplitude lower than a given amplitude threshold, and concluding the presence of contamination if said number of pixels having an amplitude lower than said amplitude threshold is less than a predetermined number of pixels, or determining the amplitude value for which the sum of pixels of lower amplitude equals a predetermined number of pixels; and concluding the presence of contamination if the amplitude value equals or exceeds a predetermined amplitude threshold.

2. The method according to claim 1, wherein said amplitude threshold is dependent on the mean of the amplitude values in the image.

3. The method according to claim 1, wherein said scene is illuminated by means of an active illumination module emitting modulated light waves and said distance information is determined based on the phase delay between emitted and received light signal.

4. The method according to claim 1, comprising generating a signal indicative of the presence or absence of contamination, respectively indicative of the level of contamination, depending on the analysis of said amplitude information.

5. A time-of-flight imager system comprising an imager sensor having an array of pixels receiving light reflected from a scene, through an optical interface, said time-of-flight imager system further including means for implementing the method according to claim 4 and for generating a signal indicative of the level of contamination.

6. The method according to claim 1, wherein said amplitude threshold is dependent on the mean of the amplitude values in the image.

* * * * *